US010612304B2

(12) United States Patent
Fischer et al.

(10) Patent No.: US 10,612,304 B2
(45) Date of Patent: Apr. 7, 2020

(54) APPARATUS FOR SETTING UP A LADDER OR A STEP ON A STAIRCASE

(71) Applicant: Hailo-Werk Rudolf Loh GmbH & Co. KG, Haiger (DE)

(72) Inventors: Christian Fischer, Siegen (DE); Gerd Weinhold, Bad Berleburg (DE); Alexander Faut, Wenden (DE)

(73) Assignee: Hailo-Werk Rudolf Loh GmbH & Co. KG, Haiger (DE)

( * ) Notice: Subject to any disclaimer, the term of this patent is extended or adjusted under 35 U.S.C. 154(b) by 0 days.

(21) Appl. No.: 15/891,091

(22) Filed: Feb. 7, 2018

(65) Prior Publication Data

US 2018/0223597 A1    Aug. 9, 2018

(30) Foreign Application Priority Data

Feb. 8, 2017  (DE) .................... 20 2017 100 661 U

(51) Int. Cl.
| | |
|---|---|
| *E06C 7/44* | (2006.01) |
| *F16M 11/26* | (2006.01) |
| *E04G 1/34* | (2006.01) |
| *E04G 1/32* | (2006.01) |
| *E04G 1/36* | (2006.01) |
| *E04G 3/22* | (2006.01) |

(52) U.S. Cl.
CPC .................. *E06C 7/44* (2013.01); *E04G 1/32* (2013.01); *E04G 1/34* (2013.01); *E04G 1/365* (2013.01); *F16M 11/26* (2013.01); *E04G 3/22* (2013.01)

(58) Field of Classification Search
CPC ..... A47B 13/12; A47B 2037/005; A47B 5/00; A47B 5/06; E06C 7/44; E04G 1/365; D06F 81/06

USPC ........... 108/42, 44, 47, 48, 152; 297/423.41, 297/423.39; 182/200, 45, 48, 107, 108
See application file for complete search history.

(56) References Cited

U.S. PATENT DOCUMENTS

| | | | | |
|---|---|---|---|---|
| 1,474,250 | A | | 11/1923 | Folliard |
| 1,912,947 | A | * | 6/1933 | Martin ...................... E04G 1/34 182/152 |
| 2,721,777 | A | * | 10/1955 | Willis .................... B60N 3/001 108/44 |
| 2,833,608 | A | * | 5/1958 | Tobias ................... B60N 3/001 108/44 |

(Continued)

FOREIGN PATENT DOCUMENTS

| | | |
|---|---|---|
| DE | 102004023357 A1 | 12/2005 |
| GB | 2394248 A | 4/2004 |
| JP | S48-17387 U | 2/1973 |

OTHER PUBLICATIONS

Search Report in corresponding European Patent Application No. 17203446, dated Jun. 6, 2018, with English translation.

*Primary Examiner* — Jose V Chen
(74) *Attorney, Agent, or Firm* — Edell, Shapiro & Finnan, LLC

(57) ABSTRACT

An apparatus for setting up a ladder or a step on a staircase comprises: a platform on which the ladder or the step can be set up; and a frame to support the platform on the staircase. The frame comprises at least two legs each pivotable about a common pivot axis or about respective pivot axes, wherein the common pivot axis or the respective pivot axes lie in a plane of the platform or parallel to the plane of the platform.

17 Claims, 12 Drawing Sheets

(56) References Cited

U.S. PATENT DOCUMENTS

| | | | | |
|---|---|---|---|---|
| 3,709,159 | A * | 1/1973 | Oglesby, Jr. | A47B 3/0912 108/129 |
| 4,371,057 | A * | 2/1983 | Blier | E04G 1/32 182/182.4 |
| 4,457,397 | A * | 7/1984 | Scala | E04G 1/24 182/116 |
| 4,494,465 | A * | 1/1985 | Fick, Jr. | A47B 3/083 108/131 |
| 4,995,322 | A * | 2/1991 | Frederick | A47B 5/06 108/38 |
| 5,697,180 | A * | 12/1997 | Morizio | F41A 23/02 42/94 |
| 5,996,507 | A * | 12/1999 | Joseph | B60N 3/001 108/125 |
| 6,508,184 | B1 * | 1/2003 | Winter | A47B 3/0915 108/125 |
| D536,799 | S * | 2/2007 | Freitas | D25/66 |
| 7,341,005 | B2 * | 3/2008 | Baggott | A47B 5/00 108/152 |
| 7,686,134 | B1 * | 3/2010 | Harris | E04G 1/36 182/200 |
| 7,735,431 | B2 * | 6/2010 | Neunzert | A47B 3/083 108/129 |
| D621,959 | S * | 8/2010 | Klockler | E06C 7/426 D25/62 |
| 7,845,119 | B2 * | 12/2010 | Black | E04G 1/36 52/127.2 |
| 7,966,950 | B2 * | 6/2011 | Volpe, Jr. | B60N 3/002 108/115 |
| 8,042,653 | B2 * | 10/2011 | Grebinoski | E04G 1/15 182/223 |
| 8,113,316 | B2 * | 2/2012 | Sward | G01N 33/497 108/62 |
| 8,186,480 | B1 * | 5/2012 | Yoakum, Jr. | E06C 1/39 182/118 |
| 8,209,802 | B2 * | 7/2012 | Linares | A61G 1/013 108/129 |
| 9,404,305 | B1 * | 8/2016 | Messick | E06C 7/16 |
| 10,030,447 | B2 * | 7/2018 | Pyros | E04G 1/18 |
| 2017/0314329 | A1 * | 11/2017 | Pyros | E04G 1/18 |
| 2018/0106109 | A1 * | 4/2018 | Boller | E06C 7/44 |

* cited by examiner

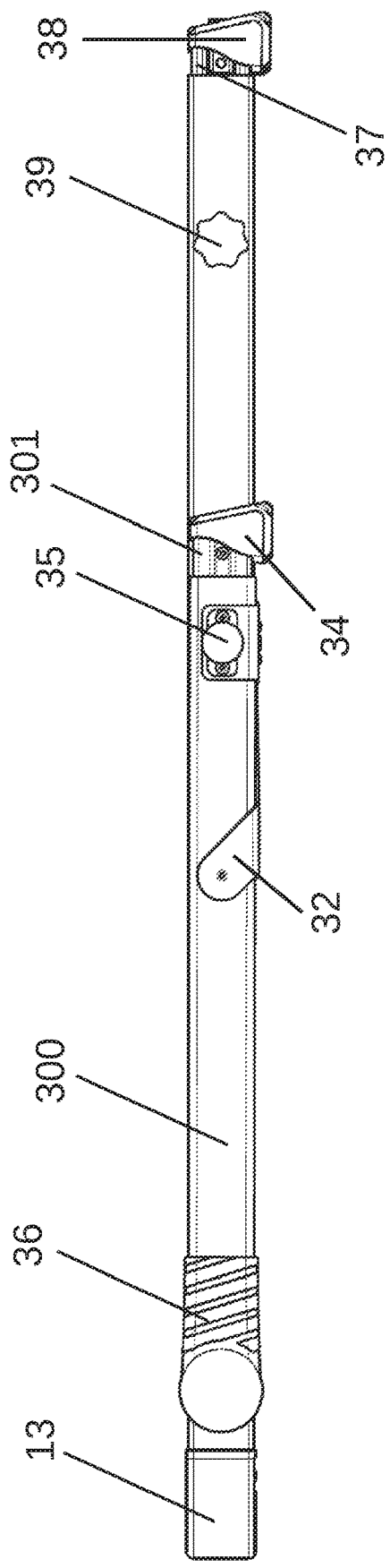
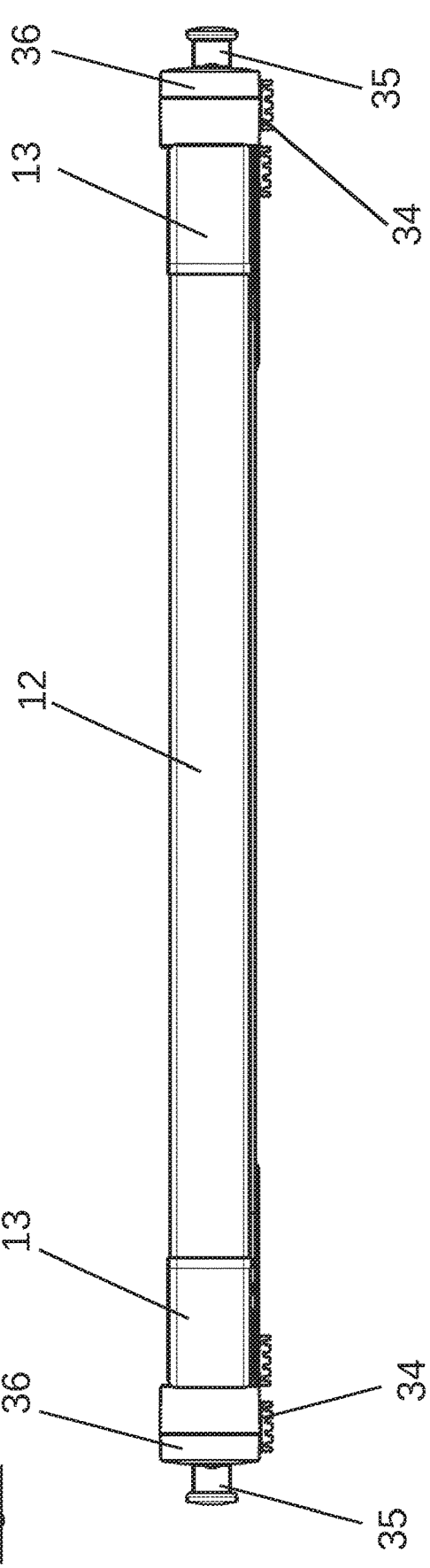
Fig. 6
Fig. 7

APPARATUS FOR SETTING UP A LADDER OR A STEP ON A STAIRCASE

CROSS REFERENCE TO RELATED APPLICATIONS

This application claims foreign priority under 35 U.S.C. § 119(a)-(d) to Application No. DE 202017100661.1 filed on Feb. 8, 2017, the entire contents of which are hereby incorporated by reference.

TECHNICAL FIELD

The present invention relates to an apparatus for setting up a ladder or step on a staircase.

BACKGROUND

The document DE 10 2004 023 357 discloses an apparatus that is suitable and designed to be used to set up a ladder or a step on a staircase.

The apparatus, known from the document DE 10 2004 023 357 A1, has a frame with a stand and a plate that can be pivoted about a horizontal axis. The stand has two feet, which can be placed on a step of a staircase. The plate of the frame is connected to a platform in a manner allowing rotation. The platform is supported with one end on the frame. With the other end the platform rests on another step of the staircase and, in particular, such that the platform is more or less horizontal.

Ladders or steps can be set up on the platform of the apparatus.

The apparatus has not been widely used in the field.

SUMMARY

Therefore, the object of the present invention is to propose an apparatus of the type that is described in the introductory part and that comprises a frame and a platform that is more appropriate for an application.

The aforementioned object is achieved in accordance with the present invention by the feature that the frame of an apparatus, according to the invention, has at least two pivotable legs, which can be pivoted about one pivot axis each or about a pivot axis, where in this case the pivot axes or the pivot axis lie or lies in a plane of the platform or parallel thereto.

In contrast to the apparatus disclosed in the document DE 10 2004 023 357 A1, the frame of the apparatus of the present invention comprises at least two legs, which are pivotably attached to the platform. The apparatus, known from the document DE 10 2004 023 357 A1, comprises a single leg, which is fastened to a plate about an axis parallel to the platform, where in this case the plate is rotatably and displaceably attached to the platform. The connection of the two legs of the apparatus, according to the present invention, to the platform is more stable than the connection of the leg of the prior art apparatus to the platform with the interpositioning of the rotatable and displaceable plate. As a result, the apparatus is also more stable and, on the whole, gives the impression of being more reliable.

At least one of the legs can be extendible. The leg may be, in particular, extractable, for example, telescopically extractable. As a result, it is possible to adjust the legs, provided that they have initially the same length, such that the legs have different lengths. Legs of different length can be supported on different steps of a staircase, so that the platform can be oriented horizontally or almost horizontally, when the two legs cannot be arranged on one step. This may be the case, in particular, for a helical staircase, a spiral staircase or a winding staircase.

In order for the legs to be telescopically extractable, the legs may have two leg members: a first leg member and a second leg member that is disposed displaceably in the first leg member. Each leg may have at least one spring, by which the second leg members are pulled into the first leg member, when the two leg members are not fixed relative to each other by a clamping or locking mechanism. The locking mechanism can be designed such that the second leg member can be pulled out without manually operating the locking mechanism. For this purpose a locking bolt or a locking hook can exhibit a bevel. Owing to the extraction motion the locking bolt or the locking hook slides out of a locking hole in the second leg member. Not until the second leg member is moved in the opposite direction does the locking bolt or the locking hook snap into a locking hole again, as a result of which the first leg member and the second leg member are fixed relative to each other. In order to insert the second leg members, the locking bolts or the locking hooks have to be manually pulled back against the pressure of a second spring.

Stud bolts can be provided on the free ends of the legs. Knurled nuts may be screwed onto the stud bolts. Feet may be fastened to the ends of the stud bolts. Knurled nuts may be rotatably mounted in each of these feet. One edge of each knurled nut protrudes preferably through slots in the feet towards the external environment, so that the knurled nuts may be rotated by a user. The knurled nuts may be screwed onto the stud bolts. By rotating the knurled nuts the knurled nuts themselves and the feet can be displaced on the stud bolts. In this way, a fine adjustment of the length of the leg is possible.

The legs or the members of the legs can be connected to each other via a traverse, a feature that also gives the frame more stability. Additional stability can be achieved, if the legs or the members of the legs and the traverse are connected to each other by first struts.

At least one holding mechanism, in particular, a clamping mechanism, a clip or the like, in which a leg, both legs and/or the traverse can be releasably fixed in the folded up state, can be mounted on or attached to the platform. With this attachment it is possible to prevent the legs from inadvertently unfolding, when the apparatus of the present invention is not in use.

The frame of an apparatus, according to the present invention, can comprise at least a second strut, which can be pivotably attached to one of the legs with a first end or is attached to the platform with a first end in a pivotable and at least indirect manner. The first struts and the at least one second strut may be arranged in planes that are oriented perpendicular to each other.

A second end of the second strut can be pivotably and slidably attached to one of the legs or can be attached to the platform in a pivotable and slidable and at least indirect manner. The second strut may have a slot, through which a protruding element of the leg or the platform engages. As a result, the at least one second strut can be pivotable, on the one hand, about the protruding element, but, on the other hand, can also be displaceable with respect to the protruding elements.

On one side of the apparatus, the platform can be supported on the steps of the staircase by the frame, while on another side the platform rests on the steps of the staircase. However, the frame of an apparatus, according to the invention, may also comprise arms, which are fastened to the platform in an extractable at least indirect manner. In this case the extraction plane is in a plane of the platform or is parallel to this plane. The other side of the platform may be supported by these arms on the steps of the staircase. The arms may be brought into varying lengths by pulling out. The arms and the legs can form parts of the frame of an apparatus according to the invention, where the parts are not directly connected to each other.

The preferably two arms of the frame may be fastened at least indirectly to the platform on opposite sides of the platform.

The platform of an apparatus, according to the invention, may have a rim and a plate, where in this case the rim encloses the plate at the at least two opposite edges. In the foregoing the plane of the plate denotes the plane, which corresponds to the upper or lower surface of the plate or to a plane parallel thereto in an erected state of the apparatus.

The legs may be pivotably fastened to the rim of the platform. Even the second struts may be pivotably fastened or may be pivotably and slidably fastened to the rim.

The rim may comprise hollow profiles, in which or to which the arms may be displaceably and/or extractably fastened.

The platform, in particular, the plate of the platform, may have one or more grip holes, which a user may grasp in order to transport the apparatus with the legs folded out or in the folded together state.

BRIEF DESCRIPTION OF THE DRAWINGS

Other features and advantages of the present invention will become apparent from the following description of one exemplary embodiment depicted in the figures, wherein:

FIG. 6 is a side view of the exemplary embodiment in the folded up state;

FIG. 7 is a view of the exemplary embodiment in the folded up state from the front;

DETAILED DESCRIPTION

Figure 1:
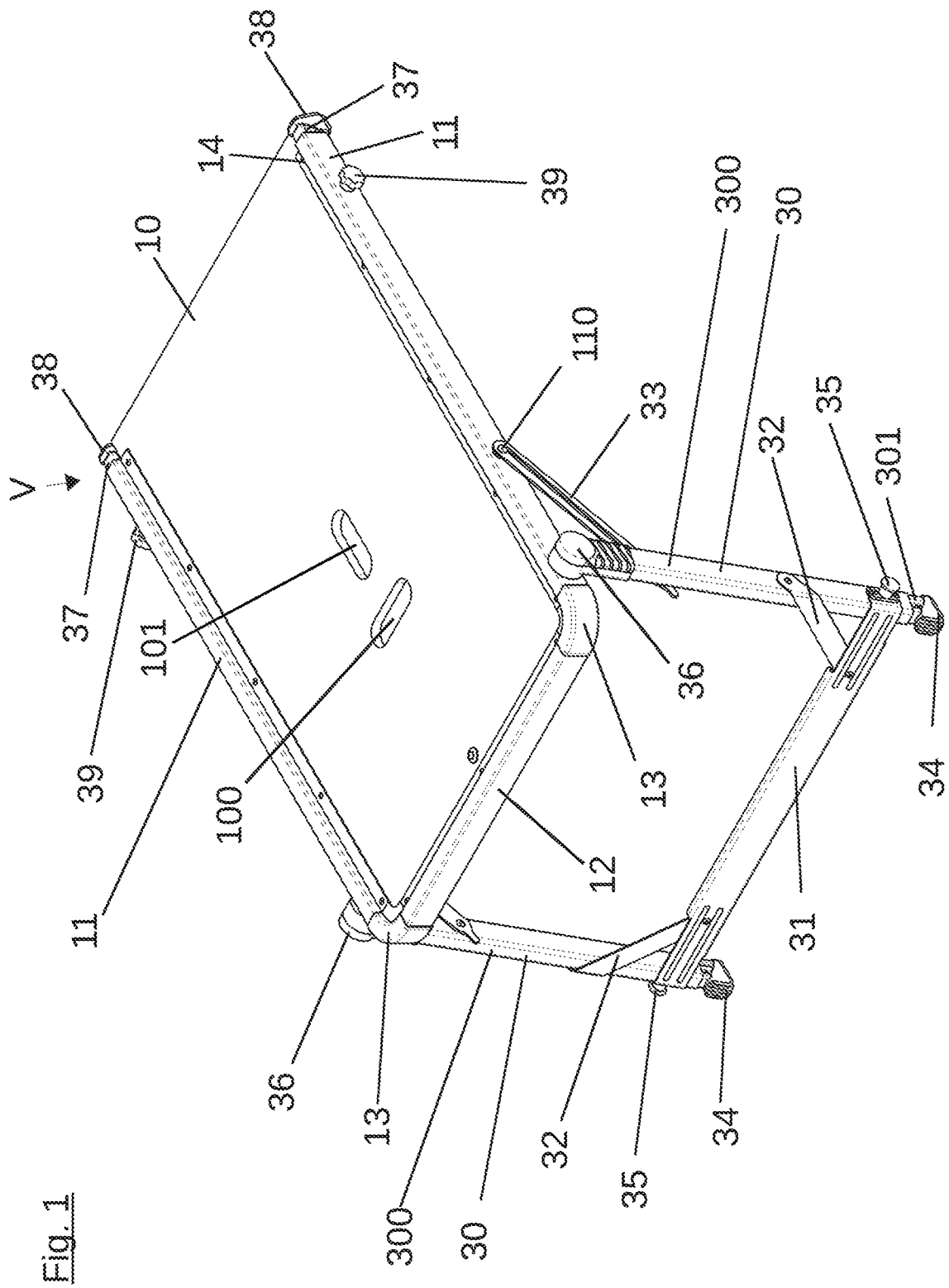
FIG. 1 is a perspective view of the exemplary embodiment in the folded out state.
Figure 2:
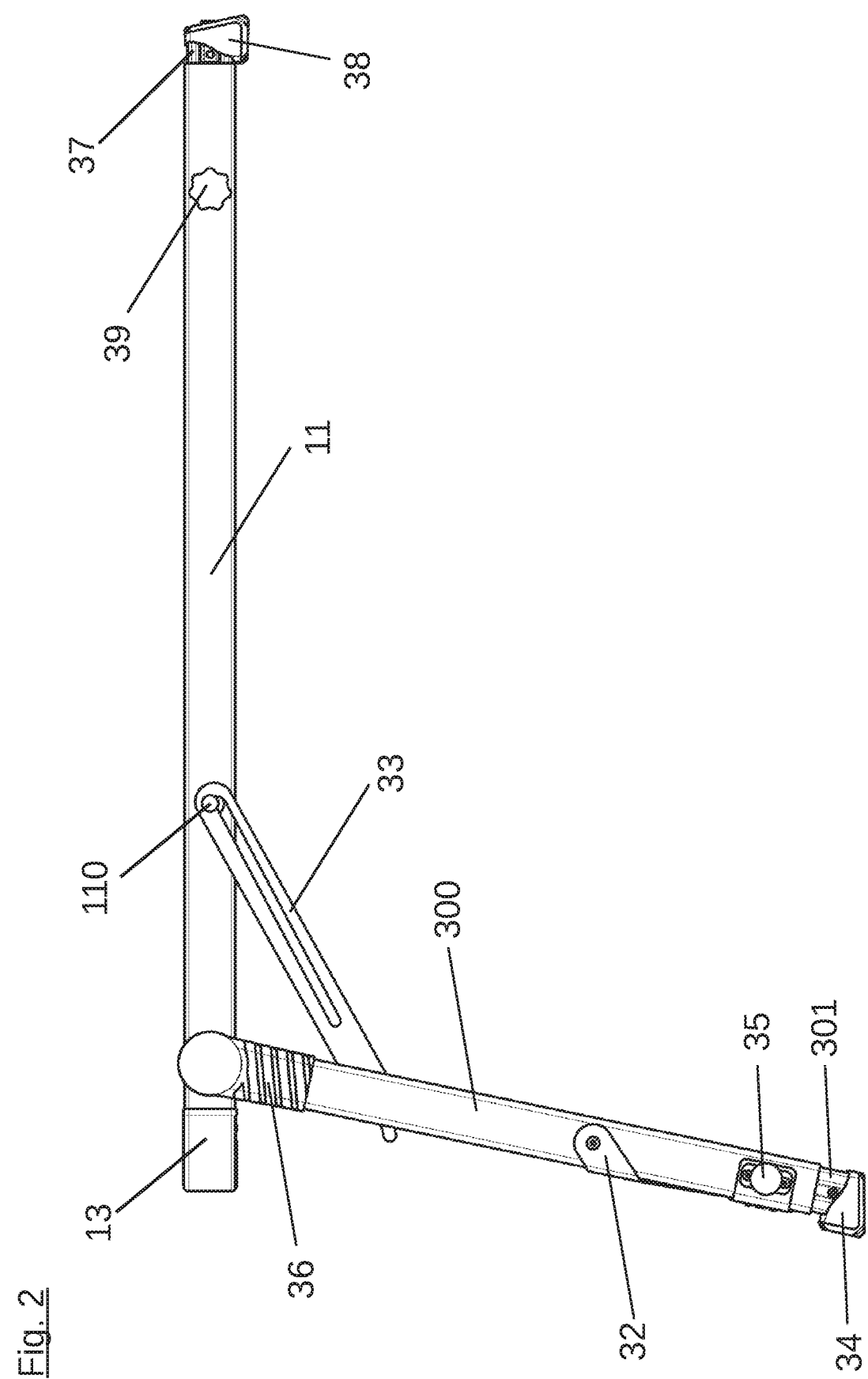
FIG. 2 is a side view of the exemplary embodiment in the folded out state.
Figure 3:
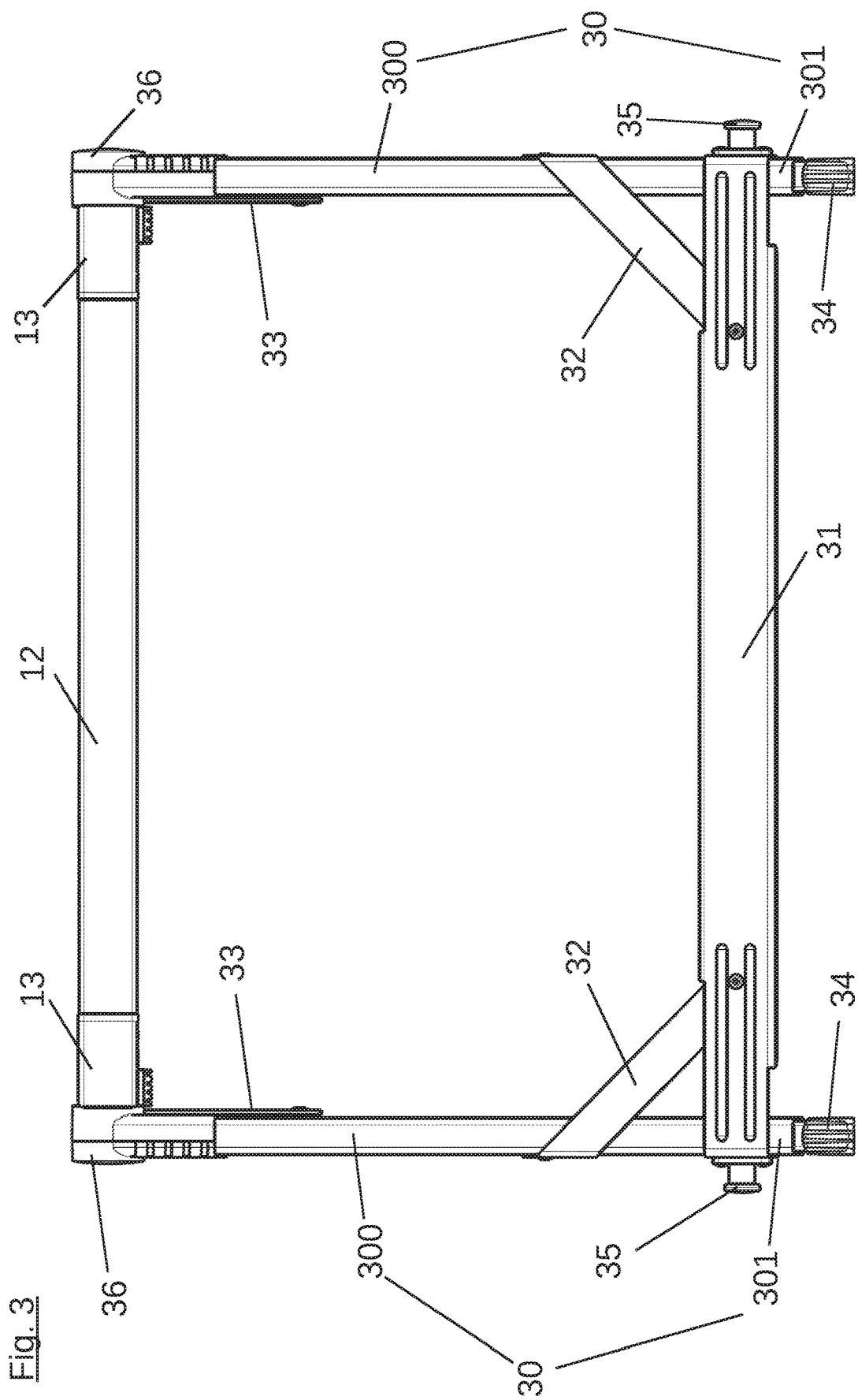
FIG. 3 is a view of the exemplary embodiment in the folded out state from the front.
Figure 4:
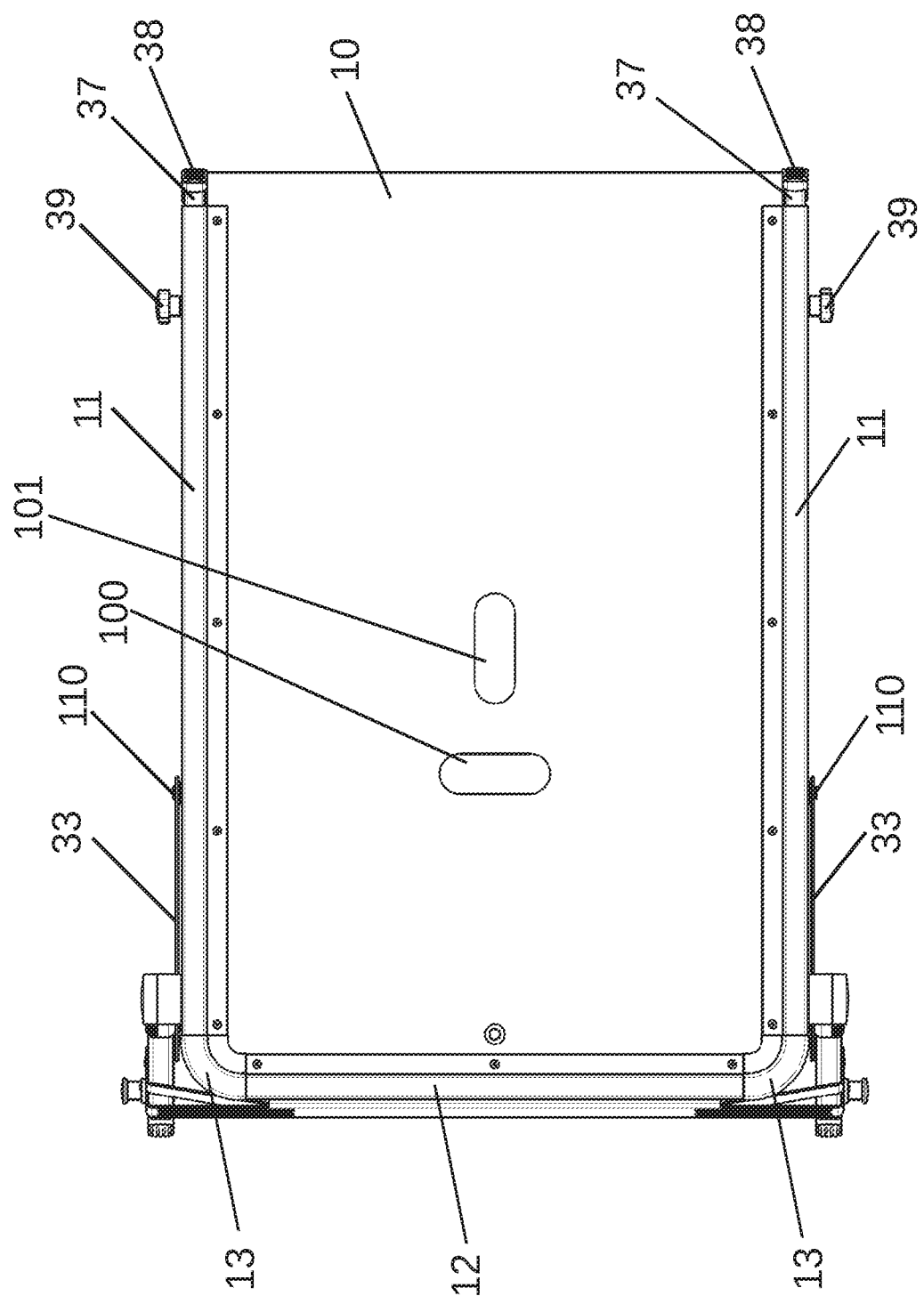
FIG. 4 is a plan view of the exemplary embodiment in the folded out state.
Figure 5:
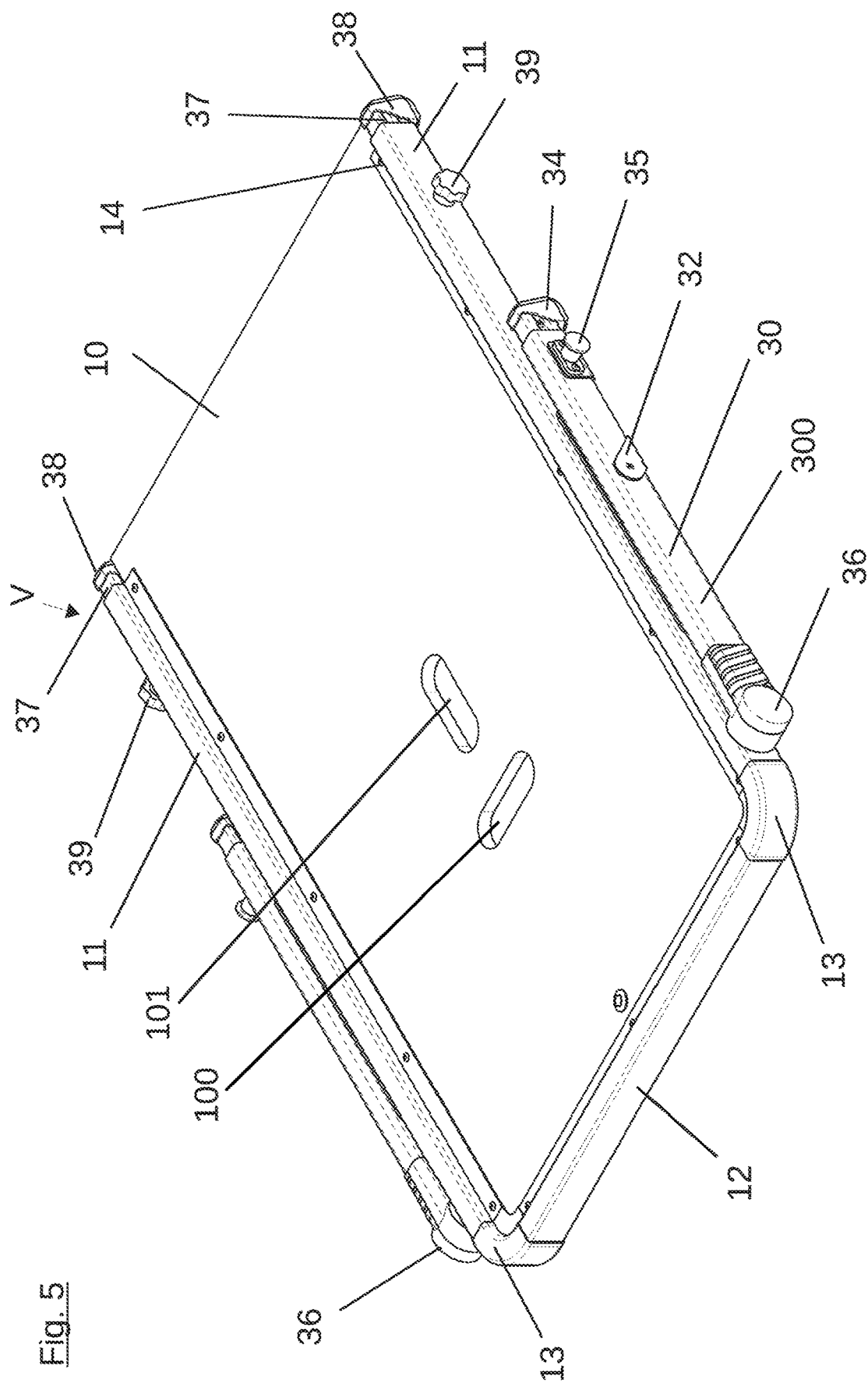
FIG. 5 is a perspective view of the exemplary embodiment in the folded up state.
Figure 8:
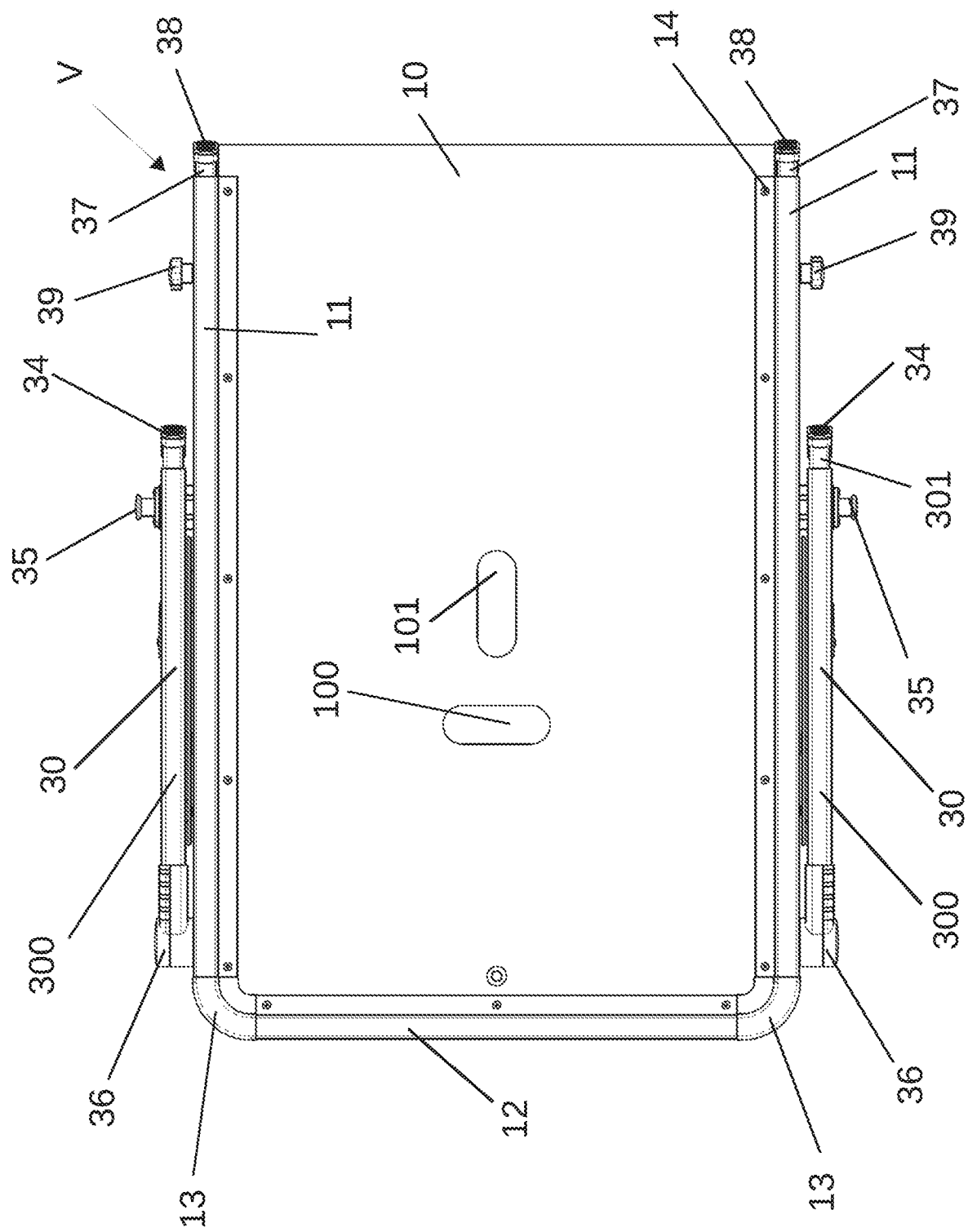
FIG. 8 is a plan view of the exemplary embodiment in the folded up state.
Figure 9:
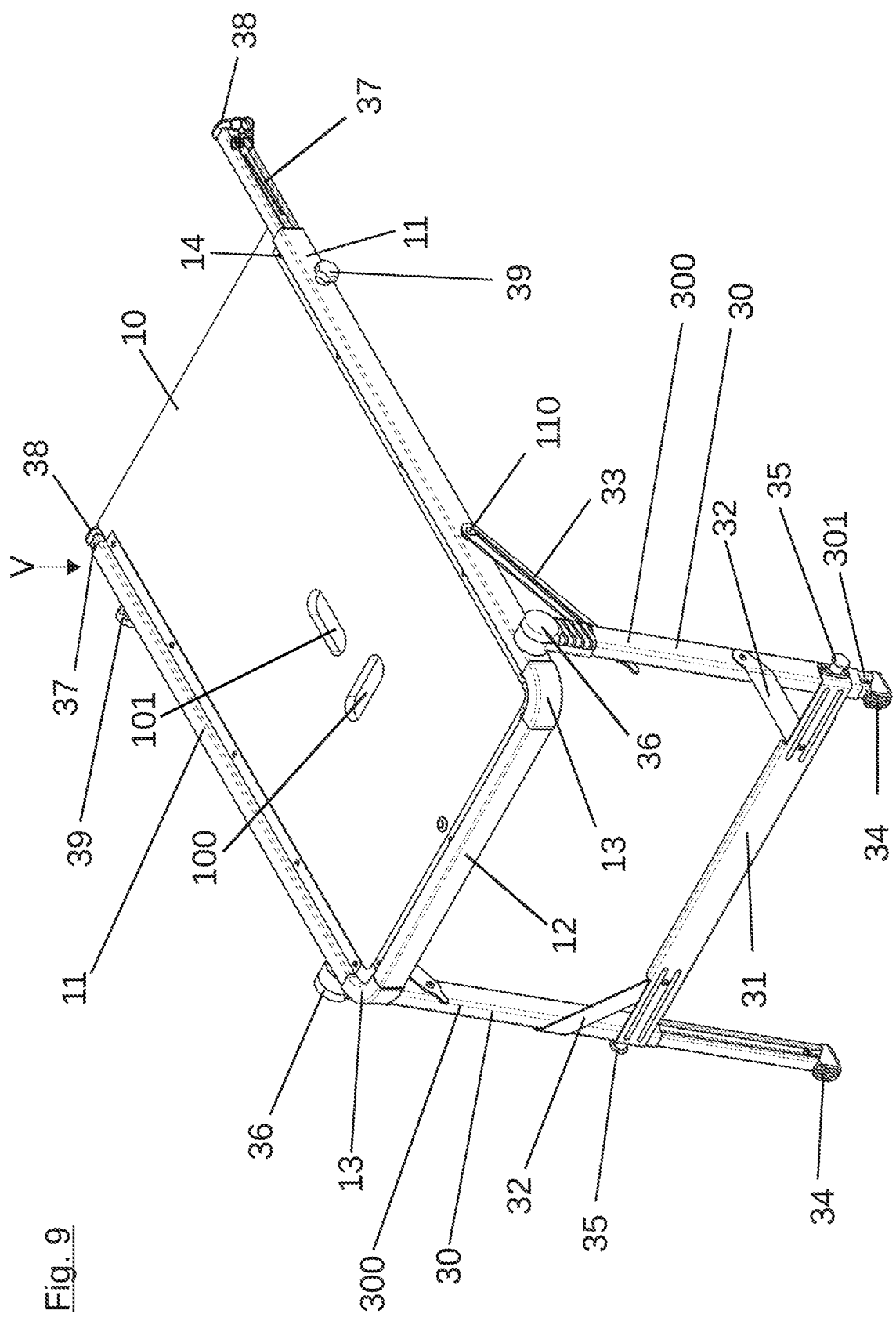
FIG. 9 is a view of the exemplary embodiment from the bird's eye perspective in the folded out state with the arms and legs partially pulled out.
Figure 10:
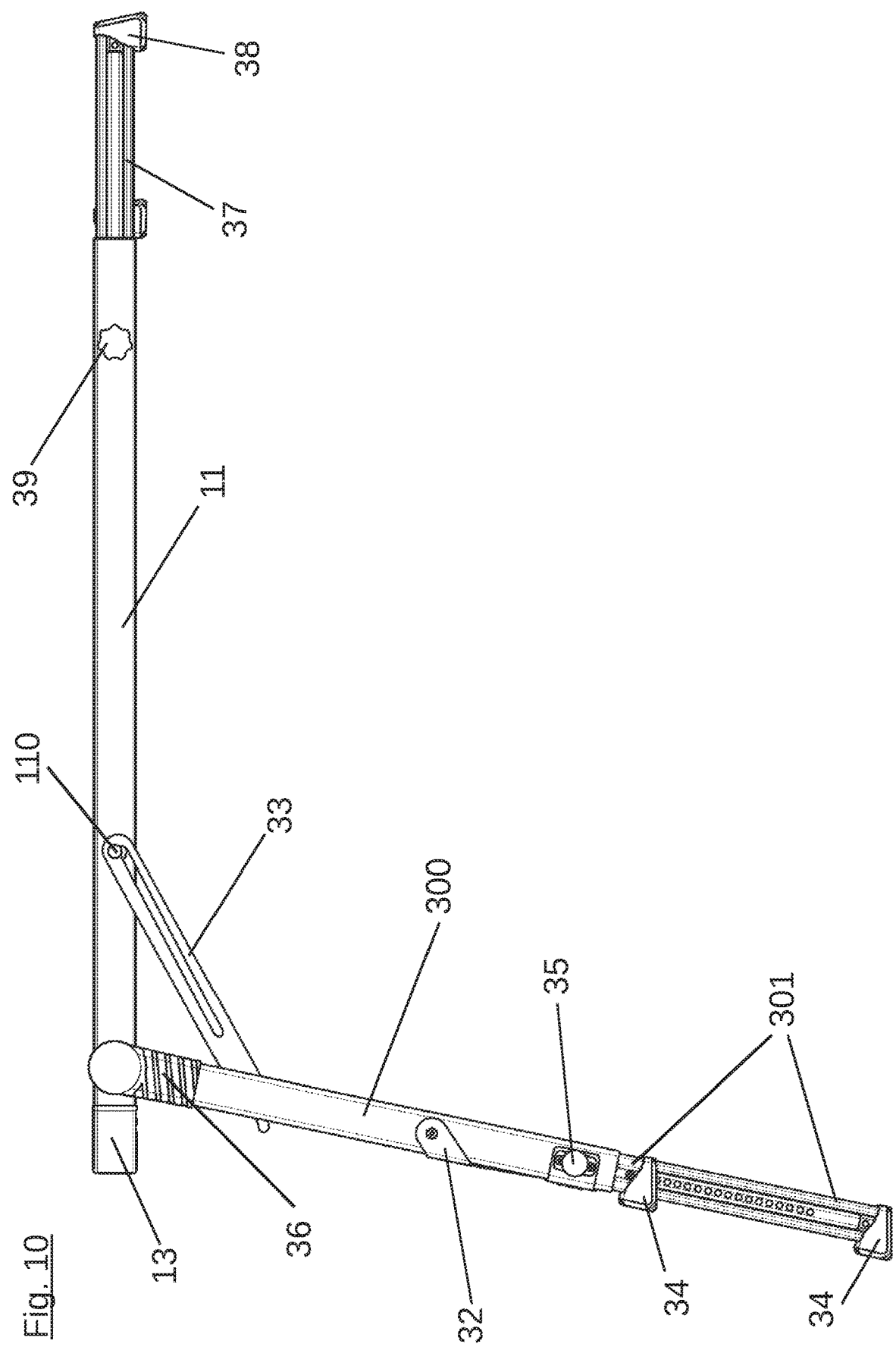
FIG. 10 is a side view of the exemplary embodiment in the folded out state with the arms and legs partially pulled out.
Figure 11:
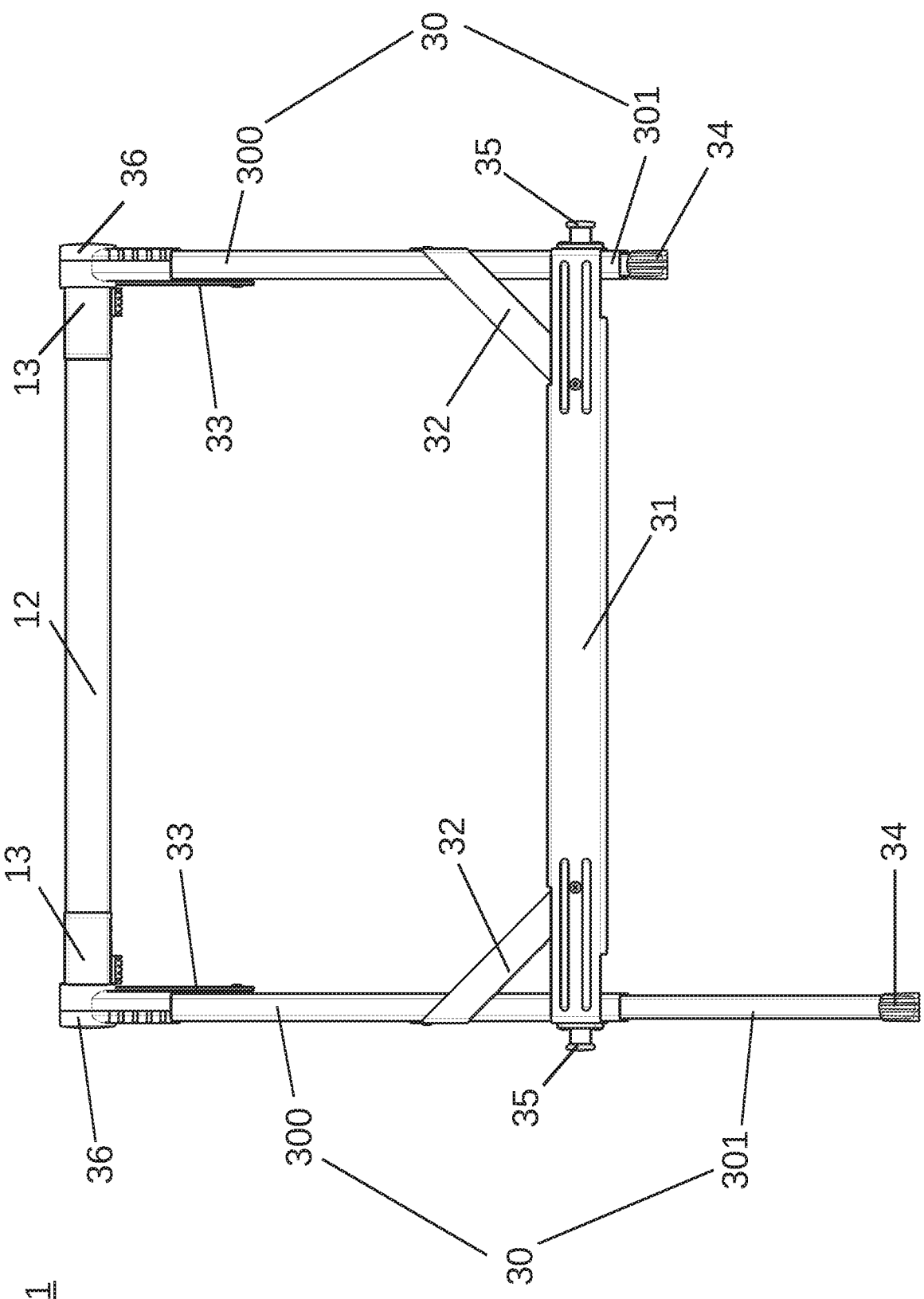
FIG. 11 is a view of the exemplary embodiment in the folded out state with partially extracted arms and legs from the front.
Figure 12:
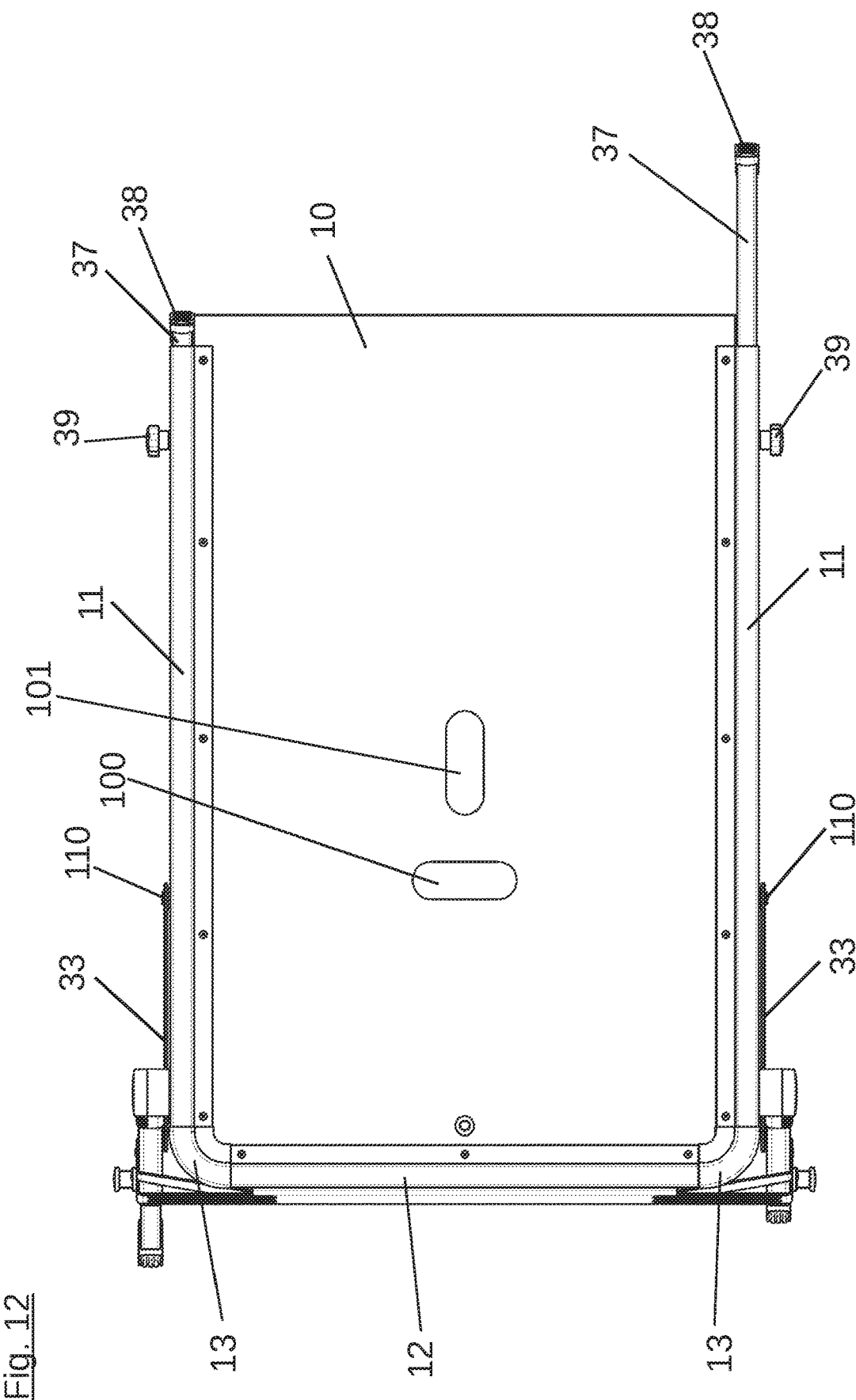
FIG. 12 is a plan view of the exemplary embodiment in the folded out state with the arms and legs partially pulled out.

The figures show an exemplary embodiment of an inventive apparatus V that is designed for setting up a ladder or a step on a staircase and that comprises a platform. The platform is formed by, among other things, a plate 10. Three edges of the plate 10 are enclosed with the hollow profiles 11, 12; and, in particular, the opposite longitudinal sides of the plate 10 are enclosed with the hollow profiles 11; and one of the narrow sides is enclosed by the hollow profile 12. The edges between this narrow side and the two longitudinal sides are enclosed with shaped parts 13, which are inserted into the ends of the hollow profiles 11, 12. The shaped parts 13 may be made of a synthetic plastic material. The hollow profiles 11, 12 are made preferably of aluminum.

The hollow profiles 11, 12 have preferably two cantilevered webs 111 (FIG. 14), which are parallel to each other and which are at a distance from each other; and the distance is equivalent to a thickness of the plate 10. The plate 10 is inserted between the two webs 111. The hollow profiles 11, 12 are permanently connected to the plate 10 by rivets 14, which are guided through aligned through-holes in the webs 111 and the plate 10. It is also possible to select other suitable fastening elements or types of attachments.

The plate 10 is provided with two grip holes 100, 101, which facilitate the transport of the apparatus V of the invention.

The platform may be set up on a step by a frame composed of multiple parts.

The frame comprises two legs 30 and two arms 37.

The two legs 30 are pivotably fastened to the hollow profiles 11. Pivot bearings, which produce the connection between the legs 30 and the hollow profiles 11, are covered by caps 36.

The two legs 30 comprise two members 300, 301. A first member 300 is connected to the pivot bearing. The first member 300 is a hollow profile. A second member 301 of the leg 30 is arranged displaceably in the first member 300 such that the second member can be guided by the first member 300. The second member 301 can be fixed with respect to the first member 300 by a locking mechanism 35. The first member and also the second member 301 may be profiles, in particular, aluminum profiles.

Figure 13:
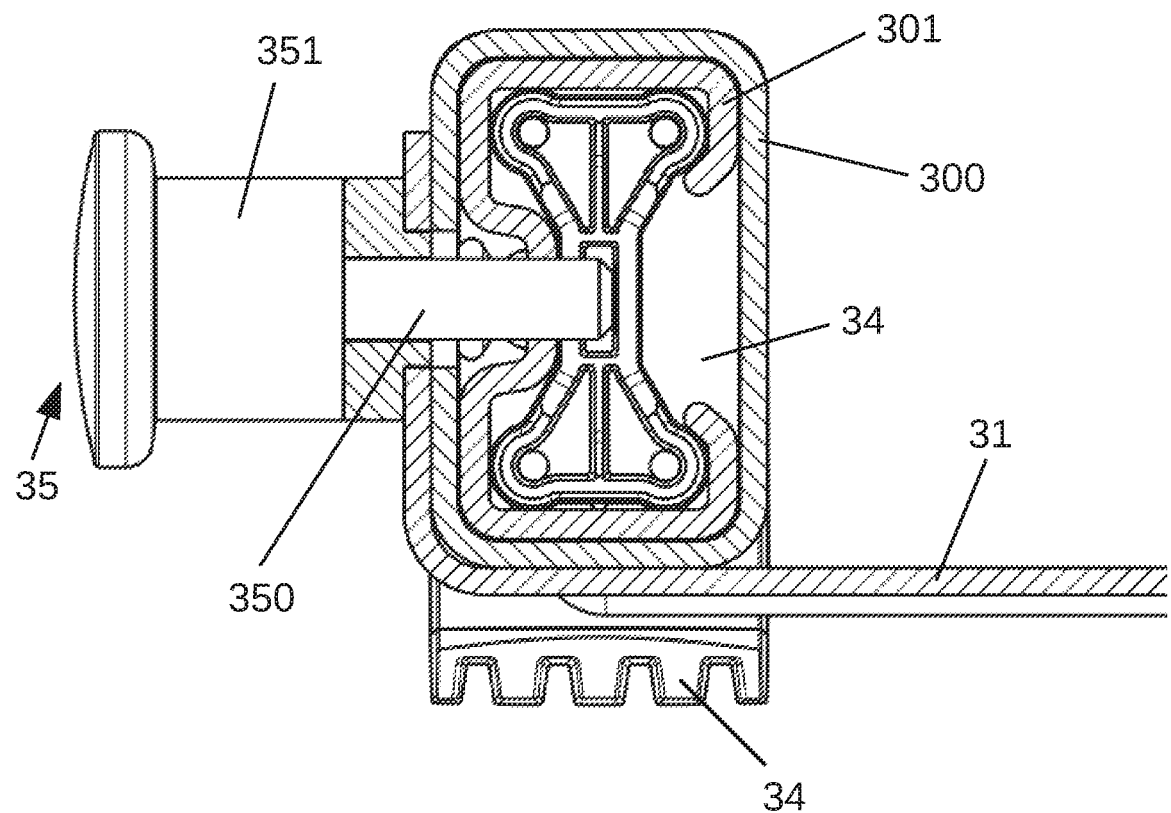
FIG. 13 is a sectional view of, among other things, a locking mechanism.

The locking mechanism 35 interacts with holes that are provided in the second members 301 of the legs 30 (see FIG. 13). The holes are provided so as to lie one after the other in a region of the second members 301 between the one, guided end and the other end that is provided with the end piece 34.

The locking mechanism 35 is arranged displaceably in holes of the first members 300 of the legs 30. A pin 350 of the locking mechanism 35 engages in these holes; and the pin also engages in one of the holes in the second members 301 of the legs 30 that is arranged in alignment with the hole in the first member 300 of the leg 30. The pin is held in the hole in the second member 301 by a spring (not shown).

The locking mechanism 35 comprises a knob 351, which offers a handle to pull back the pin against the pressure of the spring and, in so doing, to pull the pin out of the hole in the second member 301. Then the second member 301 of the leg can be moved with respect to the first member 300 of the leg 30, in order to bring another hole of the second member 301 of the leg 30 in alignment with the hole in the first member of the leg 301 and to lock the pin 350 of the locking mechanism 35 in this position.

An end piece 34 is attached to an end of the second member 301 that is not arranged in the first member 300. When the apparatus of the invention is in use, the end piece is supported on a foundation. The end piece 34 can be a shaped part made of plastic, in particular, an injection molded part.

The first members 300 of the two legs 30 are connected to each other preferably by a traverse 31. In addition, there is a connection preferably between the traverse 31 and each of the first members 300 by way of first struts 32. Both the traverse 31 and the first struts 32 are used to reinforce the frame.

Furthermore, preferably second struts 33 are provided that connect the first member 300 of each leg 30 to the hollow profile 11 and to which the first member 300 is pivotably fastened. The second struts 33 define the end positions of a pivot motion of the pivotable legs 30. The second struts 33 are pivotably fastened to the first members 300 of the legs. The second struts have a longitudinal slot, in particular, elongated holes. Each slot is penetrated by a projecting element 110, which is fastened to the hollow profiles and which has a mushroom head-like head, for example, a screw or the like. The head of the element 110 is guided through the slot. During a pivot motion of the legs 30 the second struts 33 are moved relative to the projecting element 110. At the same time the heads slide in the slots of the second struts 33. Owing to the length of the slots the motion of the heads and, as a result, also the motion of the second struts and the legs are defined with respect to the platform. The length of the slots, the point of support of the second struts 33 and the position of the projecting elements 110 are selected such that in the one end position the legs are folded out (see FIGS. 1 to 4 and 9 to 12), while in the other end position the legs are folded up and rest against a bottom side of the platform or lie parallel to the platform (FIGS. 5 to 8).

In the folded out position, the projecting elements may engage in concave indentations of the longitudinal slots. In this way the projecting elements 110 can be prevented from being displaced unintentionally when the apparatus is set up.

The second struts 33 can project beyond the point of support on the legs and beyond the legs themselves in a direction facing away from the platform. These ends of the second struts 33 that project beyond the legs may form handles, with which the struts 33 can be pivoted about the point of support, for example, in order to lift the projecting elements 110 out of the concave indentations of the longitudinal slots in the second struts 33 when folding up the apparatus.

The arms 37 of the frame are rods, for example, profiles which are guided displaceably in the hollow profiles 11 of the rim of the plate 10. The arms 37 comprise end pieces 38, which are attached to the one end of the arms 37 that is not guided in the hollow profiles 11 of the rim. An extraction position of the arms 37 relative to the hollow profiles can be fixed by a clamping mechanism 39.

The arms 37 may exhibit the same cross sectional profile as the second members 301 of the legs 30. The two arms can also be compared with the second members 301 of the legs 30 in terms of their function. Not only each of the arms 37, but also each second member of the legs 301 can be pulled out independently of the others. As a result, the arms 37 and the legs 30 can be adjusted such that they can reach the points of support on different steps on a staircase.

The arms 37 and the legs 30 also have other similarities. For example, the end pieces 38 may correspond to the end pieces 34.

Figure 14:
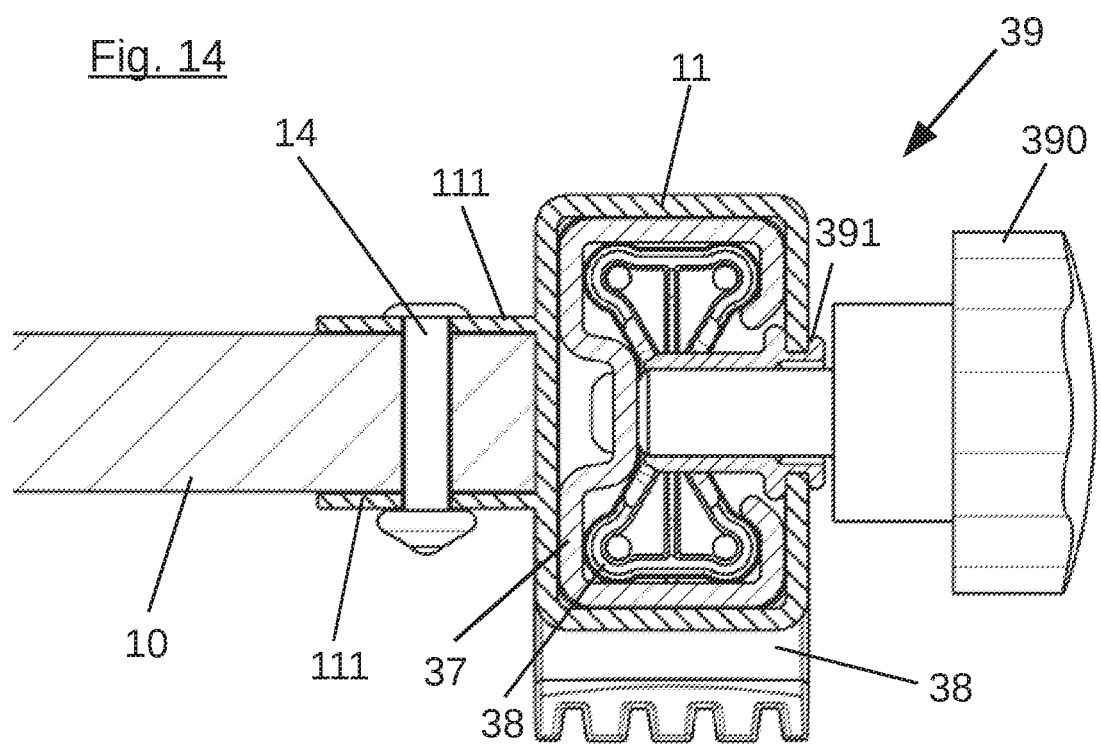
FIG. 14 is a sectional view of a clamping mechanism.

The clamping mechanism 39 comprises star head screws 390, which are screwed into the sleeve 391 having an internal screw thread (see FIG. 14). The sleeves are inserted into holes in the hollow profiles 11. By rotating the star head screws 390 the ends of the star head screws 390 can be pressed against the arms 37, which can be displaced in the hollow profile 11, as a result of which the hollow profile 11 and the arms 37 are fixed with respect to each other by clamping.

What is claimed is:

1. An apparatus for setting up a ladder or a step on a staircase, comprising:
   a platform on which the ladder or the step can be set up, the platform comprising a plate having an upper surface, a lower surface, opposite longitudinal side edges extending between the upper surface and the lower surface, and a rim comprising hollow profiles connected to the plate, wherein the hollow profiles extend at least along the opposite longitudinal side edges and enclose the side edges; and
   a frame to support the platform on the staircase, the frame comprising at least two arms which are guided displaceably in the hollow profiles of the rim,
   wherein the hollow profiles of the rim are configured to fasten extractably the arms along the opposite longitudinal side edges of the plate, and
   wherein the arms are independently extractable from the hollow profiles of the rim to different lengths beyond an edge of the plate extending between the opposite longitudinal side edges in a plane of the plate corresponding to one of the upper and lower surfaces or in a plane parallel to said plane.

2. The apparatus of claim 1, wherein the frame comprises at least two legs each pivotable about a common pivot axis or about respective pivot axes, wherein the common pivot axis or the respective pivot axes lie in a plane of the platform or parallel to the plane of the platform.

3. The apparatus of claim 2, wherein the legs are extendible.

4. The apparatus of claim 3, wherein the legs are telescopically extendible.

5. The apparatus of claim 2, wherein the frame further comprises a traverse, the legs being connected to each other by the traverse.

6. The apparatus of claim 5, wherein the frame further comprises struts, the legs and the traverse being connected to each other by the struts.

7. The apparatus of claim 6, wherein the frame further comprises at least a second strut, a first end of the second strut being pivotably attached to one of the legs or being pivotably and at least indirectly attached to the platform.

8. The apparatus of claim 7, wherein a second end of the second strut is pivotably and slidably attached to one of the legs or is pivotably and slidably and at least indirectly attached to the platform.

9. The apparatus of claim 7, wherein the second struts are fastened pivotably or pivotably and slidably to the rim.

10. The apparatus of claim 2, wherein the legs are pivotably fastened to the rim.

11. The apparatus of claim 1, wherein the platform plate comprises one or more grip holes.

12. The apparatus of claim 1, wherein the hollow profiles of the rim include two parallel cantilevered webs which are spaced apart at a distance from each other equivalent to a thickness of the plate, and wherein fasteners extending through aligned through-holes in the webs and plate, when the plate is inserted between the webs, connect the hollow profiles to the plate.

13. The apparatus of claim 1, wherein the arms are rod-shaped profiles guided displaceably in the hollow profiles of the rim, and wherein an extraction position of the arms relative to the hollow profiles is fixed by a clamping mechanism insertable into holes in the hollow profiles.

14. An apparatus for setting up a ladder or a step on a staircase, comprising:
- a platform on which the ladder or the step can be set up, the platform comprising a plate having opposite longitudinal side edges and a rim comprising hollow profiles which are connected to the plate along the longitudinal side edges and enclose the side edges; and
- a frame to support the platform on the staircase, the frame comprising at least two arms which are guided displaceably in the hollow profiles of the rim,
- wherein the arms are fastened along the longitudinal side edges of the plate by the hollow profiles in a non-swivelable manner, and
- wherein the arms are independently extractable from the hollow profiles to different lengths beyond an edge of the plate extending between the opposite longitudinal side edges in a plane of the plate or in a plane parallel to said plane.

15. An apparatus for setting up a ladder or a step on a staircase, comprising:
- a platform on which the ladder or the step can be set up, the platform comprising a plate having opposite longitudinal side edges and a rim comprising hollow profiles which are connected to the plate along the longitudinal side edges and enclose the side edges; and
- a frame to support the platform on the staircase, the frame comprising at least two arms which are guided displaceably in the hollow profiles of the rim,
- wherein the arms are fastened along the longitudinal side edges of the plate by the hollow profiles and are only extractable from the hollow profiles parallel to one another in a non-swivelable manner, and
- wherein the arms are independently extractable from the hollow profiles to different lengths beyond an edge of the plate which extends between the opposite longitudinal side edges in a plane of the plate or in a plane parallel to said plane.

16. An apparatus for setting up a ladder or a step on a staircase, comprising:
- a platform on which the ladder or the step can be set up, the platform comprising a plate having opposite longitudinal side edges and a rim comprising hollow profiles which are connected to the plate along the longitudinal side edges and enclose the side edges; and
- a frame to support the platform on the staircase, the frame comprising at least two arms which are guided displaceably in the hollow profiles of the rim,
- wherein the arms are fastened along the longitudinal side edges of the plate by the hollow profiles and are only extractable from the hollow profiles parallel to one another, and
- wherein the arms are independently extractable from the hollow profiles to different lengths beyond an edge of the plate which extends between the opposite longitudinal side edges in a plane of the plate or in a plane parallel to said plane.

17. An apparatus for setting up a ladder or a step on a staircase, comprising:
- a platform on which the ladder or the step can be set up, the platform comprising a plate having opposite longitudinal side edges and a rim comprising hollow profiles which are connected to the plate along the longitudinal side edges and enclose the side edges; and
- a frame to support the platform on the staircase, the frame comprising at least two arms which are guided displaceably in the hollow profiles of the rim,
- wherein the arms are non-telescopic, rod-shaped profiles which are fastened along the longitudinal side edges of the plate by the hollow profiles and independently extractable from the hollow profiles to different lengths beyond an edge of the plate which extends between the opposite longitudinal side edges in a plane of the plate or in a plane parallel to said plane.

* * * * *